United States Patent
Bunney et al.

(10) Patent No.: US 6,697,792 B2
(45) Date of Patent: *Feb. 24, 2004

(54) METHOD FOR DISTRIBUTING INFORMATION

(75) Inventors: William Bunney, Coconut Grove, FL (US); Tetsuya Kozo, London (GB)

(73) Assignee: Sony International (Europe) GmbH, Berlin (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/557,171

(22) Filed: Apr. 21, 2000

(65) Prior Publication Data

US 2003/0163482 A1 Aug. 28, 2003

(30) Foreign Application Priority Data

Apr. 23, 1999 (EP) .............................. 99108082

(51) Int. Cl.[7] .............................. G06F 7/00; H04H 9/00
(52) U.S. Cl. ........................ 707/1; 707/100; 707/104.1; 707/201; 725/9
(58) Field of Search .............................. 707/1, 3–5, 9, 707/513, 500, 526, 201, 100, 104.1; 725/9–11, 32, 46, 56, 98; 715/513, 526

(56) References Cited

U.S. PATENT DOCUMENTS

| 5,537,586 A | * | 7/1996 | Amram et al. ................ 707/3 |
| 6,389,593 B1 | * | 5/2002 | Yamagishi ..................... 725/9 |

FOREIGN PATENT DOCUMENTS

| EP | 0 749 081 | 12/1996 |
| WO | WO 96 34349 | 10/1996 |
| WO | WO 98 03016 | 1/1998 |
| WO | WO 98 07103 | 2/1998 |
| WO | WO 99 18518 | 4/1999 |

* cited by examiner

*Primary Examiner*—Alford Kindred
(74) *Attorney, Agent, or Firm*—Frommer Lawrence & Haug LLP; William S. Frommer; Hans R. Mahr

(57) ABSTRACT

A system for distributing information comprises at least one content source (2, 3), at least one client (4, 5), a communication network (6), a distribution server (1), a profile data base (10) associated with the distribution server (1) in which client profile information is stored, and a target count unit (9) in the distribution server (10) for effecting a target count by comparing the client profile information of the profile data base (10) with target client information of a target count request sent from one of the content sources (2, 3). Information from one of the content sources (2, 3) is distributed to at least one client (4, 5) by means of the distribution server (1) corresponding to the result of the target count effected by the target count unit (9).

21 Claims, 4 Drawing Sheets

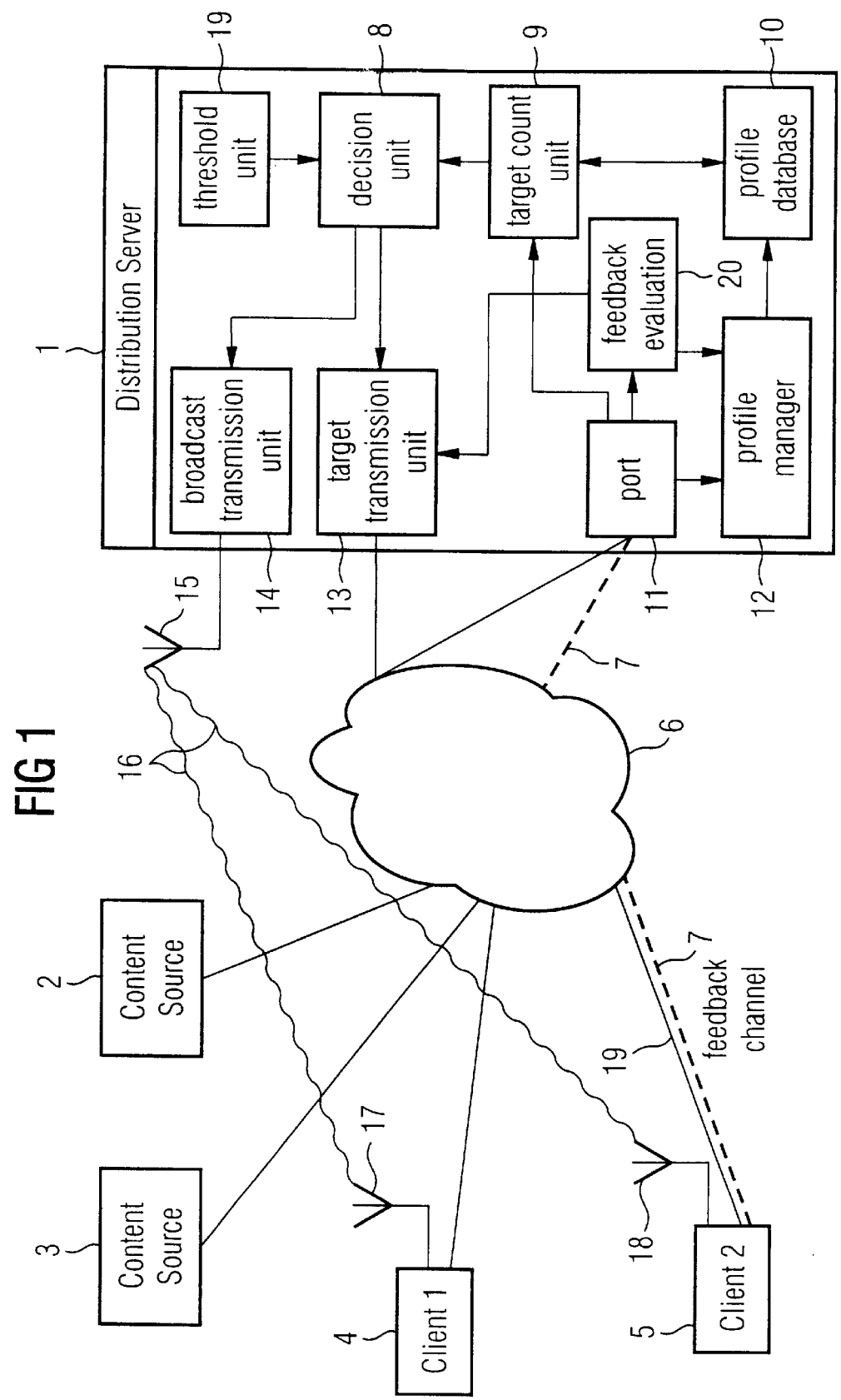

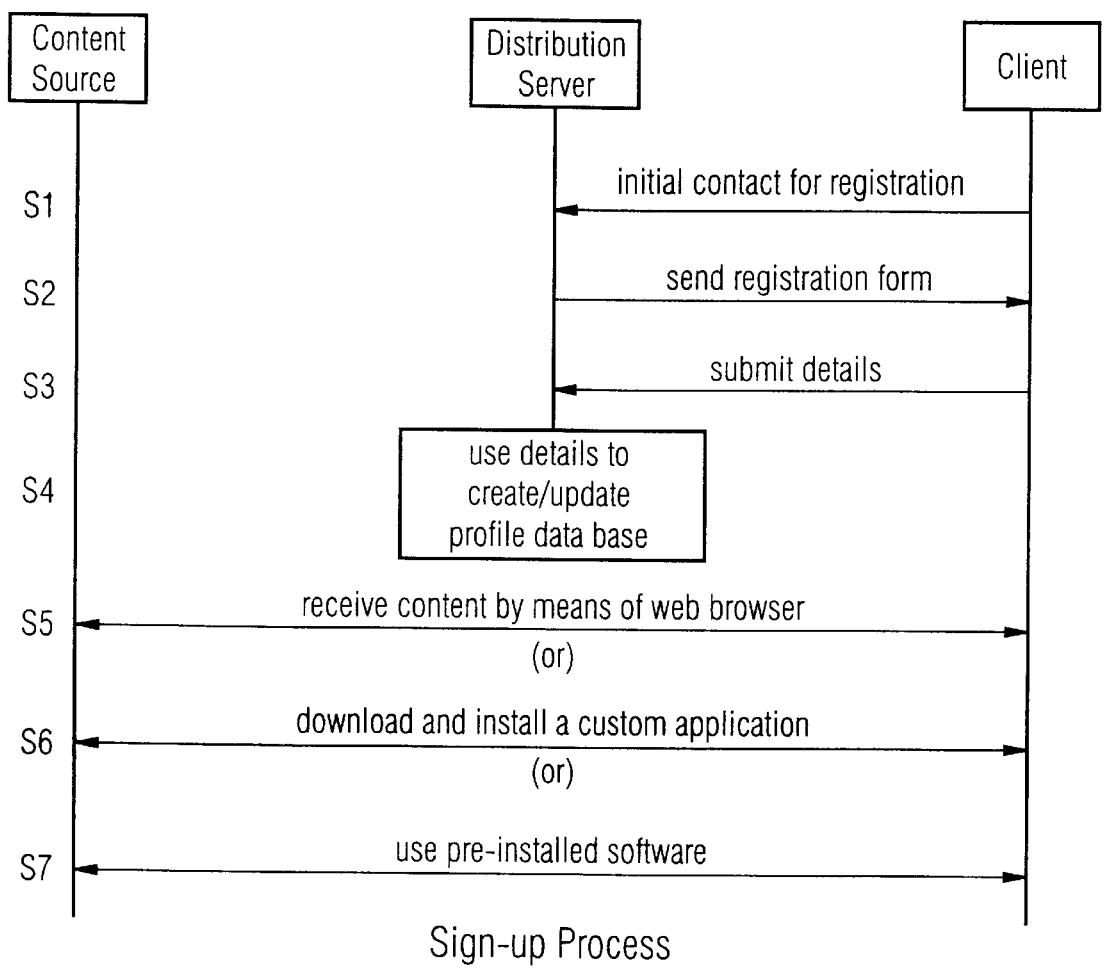

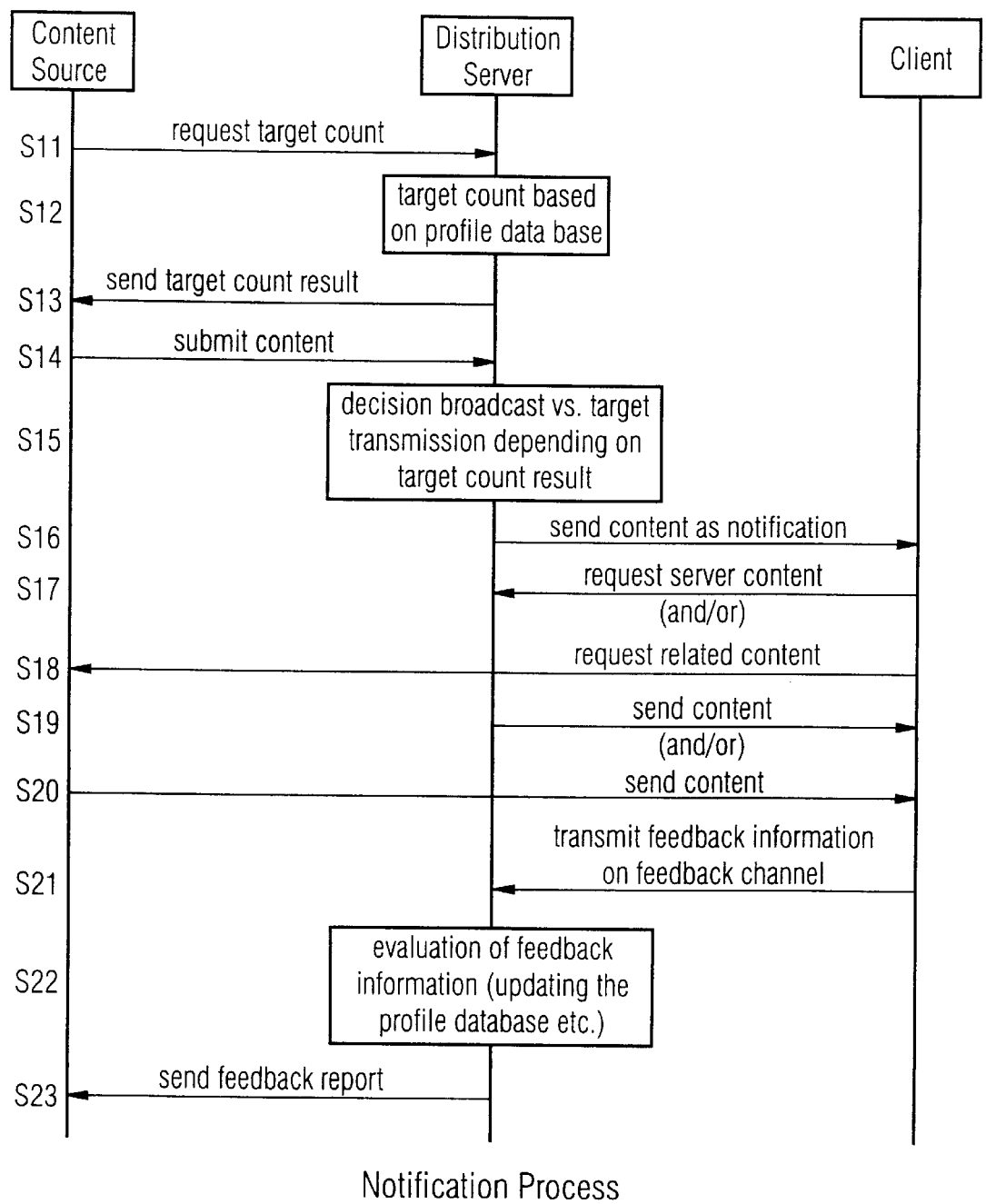

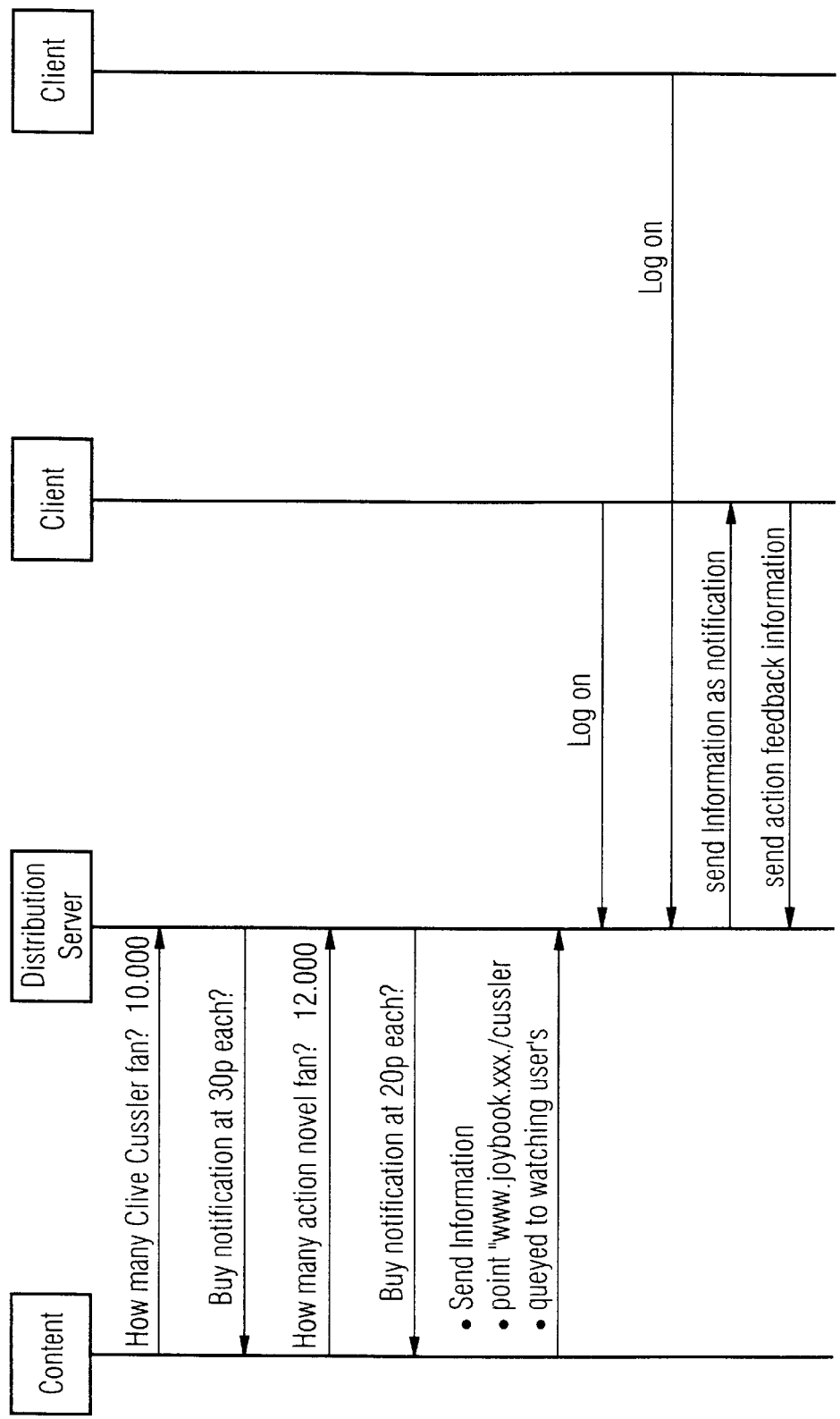

METHOD FOR DISTRIBUTING INFORMATION

The present invention relates to a method for distributing information from at least one content source to at least one client by means of a network and a server, to a system for distributing information as well as to a server for distributing information.

It is generally known to distribute (share) information in a network comprising at least one server and at least one client.

From EP-A-749 081 an information and advertising distribution system is known. A data server stores and updates a data base of information items and advertisements. The information items and advertisements are each categorized so that each has an associated information category. Work stations remotely located from the data server each include a display device, a communication interlace for receiving at least a subset of the information items and advertisements in the data server's database and local memory for storing the information items and advertisements received from the data server. An information administrator in each work station establishes communication with the data server from time to time so as to update the information items and advertisements stored in a local memory with at least a subset of the information items and advertisements stored by the data server. An information display controller in each work station displays on the work stations display device at least a subset of the information items and advertisements stored in a local memory when the work station needs predefined idleness criteria. At least a subset of the work stations include a profile of a storing subscriber profile data. The subscriber profile data represents subscriber information viewing preferences, indicating information categories for which the subscriber does and does not want to view information items. The information display controller includes a filter for excluding from the information items displayed on the display device those information items inconsistent with its subscriber profile data. According to this known system therefore a filter process is effected on the remote work stations on the basis of the information items and the subscriber profile data stored in the profiler of the work stations.

From U.S. Pat. No. 5,515,098 a system for distributing commercials to an individually addressable subscriber terminal on a network is known. Commercial messages to be distributed over the network contain imbedded information identifying categories of recipients for each message. A server located on the network, provides each commercial with addresses of terminals to which the commercial is to be distributed. The addresses are selected by the server based on demographic and other information related to the households of subscribers. The commercial is received by an addressable set-top box and displayed on a TV screen.

From U.S. Pat. No. 5,864,823 a system for distribution of advertisements to interested recipients only via one-way non-addressable television media and for transmission of orders from recipients to advertisers via two-way addressable Internet media is known. At the recipients side, each preliminary message is processed by a computer that stores recipients profile data, and if the profile indicates an interest, the corresponding advertisement is selected and its presentation is recorded at the time of transmission. The recipients never see the messages as they are intended for high-speed-volume automatic processing by the recipients computers. Each recipients computer compares all preliminary messages with recipients profile data so that each advertisement would be selected or rejected before it is transmitted. Profile data are collected by presenting relevant questions with multiple-choice answers to the recipient. The non-addressable communication medium therefore is only used for transmission of preliminary messages which are not viewable by the user. It is important to note that the preliminary message is sent prior to the advertisement and therefore the content itself. Prior to the transmission of a digital file containing an content an authorization message can be sent via e-mail to recipients. The message specifies access dieter.

Furthermore the use of profile databases is known. In the following documents disclosing profile databases will be shortly cited. From U.S. Pat. No. 5,537,586 an apparatus for retrieving and selecting profiled textual information records from a data base of defined category structures is known. Priority values are assigned to each of a plurality of predefined category structures. Textual records are assigned a relevance value with respect to each category structure. If a record's relevance value exceeds a predetermined threshold value, that record is associated with the category structure. Each category has a list of associated textual records which are retrieved. Textural records are selected from the set of retrieved textural records and assembled into a set. Information on how the subscriber uses the set is gathered, and new rankings for the category structure are computed.

From U.S. Pat. No. 5,617,565 a broadcast interactive multimedia system is known. In said document a procedure for selecting and storing data elements communicated from a common data base to users of the data base utilising a communication link between each transmitter and a concomitant receiver accessible by the user is known. The transmitted information is augmented with attributes which are used at the receiver to select and then store locally only that information of interest to each receiver's user, wherein the attributes and the user selection paten determine secretariat for storing information locally.

From EP-A-718 784 a personalised information retrieval method and system based on a user-defined profile is known. A user-controlled client establishes communication with a stateless server, the server presenting a list of options to the client between the server and the client. The client provides an identification of the user-defined profile.

It is the object of the present invention to provide for a technique for distributing information in a network in a particularly efficient way.

The object is achieved by means of the features of the independent claims. The dependent claims develop further the central idea of the present invention.

According to the present invention therefore a method for distributing information from at least one content source, e.g. a content source to at least one client by means of a network and a distribution server is proposed. A profile data base which is associated to the distribution server is created, wherein in the profile data base client profile information is stored. A target counter request from one of the content sources is sent to the distribution server, wherein in the target counter request contains target client information. Then a target count is effected in the distribution server by comparing the client profile information of the profile data base with a target client information of the target count request. Then information from one of the content sources is distributed to at least one client by means of the distribution server, wherein the information is distributed in correspondence to the result of the target count step. "In correspondence to the result of the target count step" can for example mean that parameters of the logical or physical channel from the distribution server to the client are changed depending on the target count step.

For example, in case the result of the target count step exceeds a predetermined threshold, the information can be distributed from the distribution server to the clients by means of a broadcast transmission. In case the result of the target count step is smaller than the predetermined threshold, the information can be distributed from the distribution server to the clients by means of a target transmission.

Broadcast transmission in the sense of the present description is any transmission of information according to which no address part is attached to the information. In contrast thereto target transmission is to be understood as a transmission according to which an address part or address tag is attached to the information to be transmitted such that the target of the transmission is identified.

A feedback channel is created respectively from a client, which just received information distributed by the distribution server, to the distribution server, for transmitting an action feedback information representing an action of a user of the corresponding client in response to the information distributed by the distribution server.

The action feedback information can be used to update the profile data base.

An action report information based on the action feedback information can be generated in the distribution server and transmitted to the corresponding content source.

The information distributed by the distribution server can contain a link information representing an address of the network at which address further information related to the information distributed by the distribution server is stored.

The following steps can be executed to update the profile data base during a sign-up process:

a registration request can be sent from a client to the distribution server, subsequently a predefined registration form is sent from the distribution server to the corresponding client, user details are sent in response to the predefined registration form from the corresponding client to the distribution server, and the profile data base is updated on the basis of the user details.

According to the present invention furthermore a system for distributing information is provided. The system comprises at least one content source, at least one client, a communication network, a distribution server, a profile data base associated with the distribution server in which client profile information is stored, and a target count unit in the distribution server for effecting a target count by comparing the client profile information of the profile data base with target client information of a target count request sent from one of the content sources. The information from one of the content sources is distributed to at least one client by means of the distribution server in correspondence to the result of the target count. The content sources can for example be content sources.

The distribution server of the unit can comprise a unit for changing the parameters of the logical and/or physical distribution channel from the distribution server to the at least one client depending on the target count.

In the distribution server a decision unit can be provided which compares the result of the target count to the predetermined threshold. In case the result of the target count exceeds a predetermined threshold, the information is distributed from the distribution server to the clients by means of a broadcast transmission. In case the result of the target count is smaller than a predetermined threshold, the information is distributed from the distribution server to the clients by means of a targeted transmission.

A feedback channel can be established respectively from a client, which received information distributed by the distribution server, to the distribution server, for transmitting an action feedback information representing an action of a user of the corresponding client in response to the information distributed by the distribution server.

The action feedback information can be used to update the profile data base.

The distribution server can generate an action report information based on the action feedback information and transmit the action report information to the corresponding content source.

The information distributed by the distribution server can contain a link information representing an address of the network where further information related to the information distributed by the distribution server is stored.

The profile data base can be updated every time a use of a client is signing up with the distribution server.

According to the present invention furthermore a distribution server comprising a profile data base and a target count unit is provided. The distribution server of the unit can comprise a unit for changing the parameters of the logical and/or physical distribution channel from the distribution server to the at least one client depending on the target count.

The distribution server can comprise a feedback evaluation unit for analysing a feedback channel signal from one of the clients. Furthermore the server can comprise a decision unit.

In the following further objects, features and advantages of the present invention will come clearer from the following description of preferred embodiments of the present invention and by reference to the figures of the enclosed drawings.

FIG. 1 shows a system for the distribution of information by means of a distribution server and a network, FIG. 2 shows the signing up process according to the present invention, FIG. 3 shows the notification process according to the present invention, and FIG. 4 shows an example for a notification according to the present invention.

With reference to FIG. 1 at first a system for distributing information according to the present invention will be explained.

The central part of the system according to the present invention is a distribution server 1. Further elements of the system are at least one content source, as for example content sources 2, 3, at least one client 4, 5, and a network 6 which can be for example the Internet. The distribution server 1 can communicate with the content sources 2, 3 and the clients 4, 5 by means of the network 6. However, according to the example of FIG. 1, the content sources 2, 3 do not connect directly with the clients 4, 5. If information is to be transmitted from one of the content sources 2, 3, to at least one client 4, 5, this is done by means of the distribution server 1.

Note that the clients can be for example personal computers or TV receiver with set-top units.

As shown in FIG. 1, the network 6 is only one possibility for a communication between the distribution server 1 and the clients 4, 5. For example the distribution server 1 can communicate by means of an antenna 15 and a broadcast channel 16 with the clients 4, 5, which are provided with antennas 17 and 18, respectively. According to the embodiment of FIG. 1 this broadcast channel 16 is a oneway downlink broadcast channel. Note that the shown wireless transmission for the broadcast channel 16 is only one example and other broadcast techniques, such as for example cables etc. can be used correspondingly. As the broadcast channel 16 according to the embodiment of FIG. 1 is a oneway downlink channel from the distribution server 1 to the clients 4, 5, a client 5 which wants to respond by some action to an information received on this down link broadcast channel 16 from the distribution server 1, can establish a feedback channel 7 by means of the network 6 to the distribution server 1 and/or the content sources 2, 3 or even other external sources. The feedback channel 7 therefore can be established by the same or another physical channel as the downlink channel.

According to the embodiment of FIG. 1, the distribution server 1 can only be accessed by the clients 4, 5 by means of the network 6 i.e. by the feedback channel 7. Therefore the distribution server 1 is provided with a input port 11. The information received from client 4, 5 and/or a content source 2, 3 therefore is input to the port 11 and then forwarded for further processing to a profile manager 12 connected to a profile data base 10 and a target count unit 9. The profile manager 12 is connected to the input port 11 to analyse any action behaviour by the user of a client 4, 5 and to update the profile data base 10 correspondingly. As will be shown later on, particularly the behaviour of the user of a client 4, 5 during a signing up process is analysed by the profile manager 12 to update the profile data base 10 correspondingly. As it is known from the prior art, in the profile data base 10 typical characteristics of users of the clients 4, 5, which are called client profile information, are stored.

The distribution server 1 furthermore comprises a feedback evaluation unit 20 for analysing a feedback channel signal from one of the clients as will be described later on in detail. The feedback evaluation unit 20 is connected to the profile manager 12 to update the profile database 10 based on the analysis of the feedback channel signal from one of the clients. Furthermore the feedback evaluation unit 20 is connected to the target transmission unit 13 to send a feedback report based on the analysis of the feedback channel signal to a content source 2, 3, which will be described later on with reference to FIG. 3.

In case an information received at the input port 11 of the distribution server 1 contains a target count request from a content source 2, 3, this target count request is supplied to the target count unit 9 which on the other hand accesses the profile data base 10 to forward a target count result to a decision unit 8. The decision unit 8 compares the result of the target count effected by the target count unit 9 with a predetermined threshold supplied by a threshold unit 19. The decision unit 8 effects a decision on the basis of said comparison. In correspondence to the result of the decision effected by the decision unit 8 according to the embodiment of FIG. 1 information supplied from one of the content sources 2, 3 to the distribution server 1 is distributed.

According to one example, for example if the target count result generated by the target count unit 9 is higher than the threshold value applied from this threshold unit 19, the decision unit 8 controls the broadcast transmission unit 14 to distribute the information originating from one of the content sources 2, 3 on the broadcast channel 16. If, however, the target count result output by the target count unit 9 is smaller than the predetermined threshold value supplied from the threshold unit 19, the information originating from one of the content sources 2, 3 is distributed by the distribution server 1 by means of a targeted transmission (for example a transmission over the network 6). With other words, depending on the target count result generated by the target count unit 9 the decision unit 8 controls a broadcast transmission unit 14 or the target transmission unit 13 to effect a down link transmission to at least one of the clients 4, 5.

Note that generally speaking, according to the present invention information is distributed by the distribution server in correspondence to the result of the target count step meaning that parameters of the logical or physical channel from the distribution server to the client are changed depending on the target count step.

The operation of the distribution server 1 within the system as shown in FIG. 1 will now be explained with reference to FIGS. 2 to 4.

With reference to FIG. 2 at first a signing up process according to the present invention shall be explained.

In a step S1 one of clients contacts the distribution server 1 for a registration. This step S1 represents the initial contact. In a step S2 a registration form is sent from the distribution server 10 to the corresponding clients 4, 5. In the registration form predetermined categories to be responded by the user of the clients are proposed. For example the registration form contains questions.

In a step S3 user details are transmitted from the client to the distribution server 1, wherein the user details are in correspondence to the categories of the registration form transmitted in step S2. The user details are therefore embedded in the executed registration form sent to back to the distribution server 1.

In a step S4 the profile manager (12 in FIG. 1) updates the profile data base (10 in FIG. 1) to incorporate the newly submitted details of the corresponding client.

After the client registers, content can be received or accessed in three different ways, which are shown as steps S5, S6 and S7 in FIG. 2. Firstly, the client can receive or access content through a device with a web browser, for example netscape navigator on a personal computer, in step S5. Alternatively, the client can receive or access content by downloading and installing a custom application, for example the connection centre on the personal computer, in a step S6. Further alternatively, the client can receive or access content by using preinstalled software on a device, which is not a personal computer, for example by using embedded software in a television set top box, in a step S7.

With reference to FIG. 3 a notification process according to the present invention is explained. Thereby it is assumed that a client has already signed-up with the distribution server 1 by means of the process set forth above.

In a step S11 a content source (2, 3 in FIG. 1) sends a target count request to the distribution server 1. A target count request comprises predetermined parameters of the categories stored in the profile data base 10 associated with the distribution server 1. In a step S12 therefore the target count unit 9 of the distribution server 1 supplied with the target parameters of the target count request can effect a target count by accessing the profile data base 10. The target count result generated in step S12 is then sent to the requesting content source in a step S13. Depending on the target count result received in the step S13, the content source can then decide whether an information content is to be submitted in a step S14 to the distribution server 1.

Once the distribution server 1 has received an informational content in a step S14, the decision unit 8 in the distribution server 1 makes a decision based on the target count result generated by the target count unit 9 and a predetermined threshold value supplied from the threshold unit 19. The decision unit 8 decides on the parameters of the logical and/or physical distribution channel from the distribution server 1 to the at least one client 4, 5 depending on the result of the target count step.

In the present embodiment, the decision unit 8 can decide between different predefined physical downlink channels for a transmission of information channel from the distribution server 1 to the at least one client 4, 5. With other words, depending on a target count result for example a decision broadcast verses target transmission is effected by the decision unit 8. Then the decision unit 8 controls the broadcast transmission unit 14 or the target transmission unit 13 to transmit the informational content originating from the content source as a notification to at least one of the clients in a step S16.

Additionally or alternatively the decision unit 8 can adjust the parameters of the logical and/or physical distribution channel from the distribution server 1 to the at least one client 4, 5 depending on the result of the target count step, to optimize the transmission efficiency (costs, time, bandwidth, . . . ).

The informational content sent as a notification in step S16 from the distribution server to the client can comprise information as where to find further related information (for example a internet hyper link). In a step S17 therefore the client can request further informational content from the distribution server 1 by connecting the distribution server 1 in step S17. Additionally or alternatively the client can connect the content source or any other node of network 6 in a step S18 to request related informational content. Note that a client can request and receive content from any node of the network either by directly connecting to the corresponding node or by connecting to the corresponding node through the distribution server. In step S19, the distribution server 1 sends the requested content to the client 1. Additionally or alternatively the content source or a respective other node can send the requested related informational content to the client 1 in step S20.

As soon as the client shows any action response to the notification received in step S16, the feedback channel (7 in FIG. 1) is established and feedback information is transmitted on the feedback channel from the client to the distribution server 1 in step S21. Note that the distribution server receives the feedback information independently from the fact whether the client has contacted the distribution server, the content source or any other node of the network to collect related informational content.

In a step S22 the feedback evaluation unit 20 of the distribution server 1 evaluates the feedback information received on the feedback channel in step S21. In correspondence to the evaluation in step S22, the feedback evaluation unit 20 controls the profile manager 12 to update the profile data base 10 as an example. Furthermore the feedback evaluation unit 20 controls the target transmission unit 13 to send a feedback report representing the evaluated feedback evaluation in a step S23 to the content source which has initially requested a target count and submitted the content (steps S11 and S14 respectively).

With reference to FIG. 4 particular example for the notification process of FIG. 3 will be explained. In the example a content source which can be a service provider sends a target count request to the distribution server. The parameter of the target count request in the example of FIG. 4 is 'How many Clive Cussler fans are in the profile data base?'. The distribution server effects the target count and sends the target count result in the example of FIG. 4 '12000' to the service provider requesting.

Furthermore the service provider can be informed about the price of each of the contacts possible. In the example of FIG. 4 the service provider starts another alternative or additional target count request 'How many action novel fans?'. In this case according to the example of FIG. 4 the target count result is '12000' and another price for each possible contact is offered by the distribution server to the service provider requesting. Then the service provider instructs the distribution server to send a content information and to point for example to an internet address 'www.joybook.xxx/cussler'.

In case a client has logged on the distribution server (and is initially registered with the distribution server) the client which (according to the profile data base in the distribution server) is a Clive Cussler fan or a action novel fan receives the information by the distribution server. In the feedback channel then the action feedback information is sent from the client to the distribution server. The action feedback information can for example represent whether the client has only seen the message of the information received or whether he has shown any higher level action feedback such as for example connecting to the distribution server or the content source (or any other node of the network) in response to the informational message received.

What is claimed is:

1. Method for distributing information from at least one content source to at least one client by means of a network and a distribution server,
the method comprising the following steps:
creating a profile database associated with the distribution server, wherein in the profile database client information is stored,
sending a target count request from one of the content sources to the distribution server, the target count request containing target client information,
effecting a target count in the distribution server by comparing the client profile information of the profile database with the target client information of the target count request, and
distributing information from one of the content sources to at least one client by means of the distribution server, wherein the information is distributed in correspondence to the result of the target count step;
wherein in case the result of the target count step exceeds a predetermined threshold, the information is distributed from the distribution server to the clients by means of a broadcast transmission using a first transmission means, and
in case the result of the target count step is smaller than a predetermined threshold, the information is distributed from the distribution server to the clients by means of a targeted transmission using a second transmission means.

2. Method for distributing information according to claim 1, characterized in that parameters of the logical and/or physical distribution channel from the distribution server to the at least one client are changed depending on the result of the target count step.

3. Method for distributing information according to claim 1, characterized in that
a feedback channel respectively from a client, which received information distributed by the distribution server, to the distribution server and/or the content sources is established for transmitting an action feedback information representing an action of an user of the corresponding client in response to the information distributed by the distribution server.

4. Method for distributing information according to claim 3, characterized in that
the action feedback information is used to update the profile database.

5. Method for distributing information according to claim 3, characterized in that
an action report information based on the action feedback information is generated in the distribution server and transmitted to the corresponding content source.

6. Method for distributing information according to claim 1, characterized in that
the information distributed by the distribution server contains a link information representing an address of the network where further information related to the information distributed by the distribution server is stored.

7. Method for distributing information according to claim 1, characterized by the following steps
sending a registration request from a client to the distribution server,
sending a predefined registration form from the distribution server to the corresponding client,
sending user details in response to the predefined registration form from the corresponding client to the distribution server, and
updating the profile database on the basis of the user details.

8. Method for distributing information according to claim 1, characterized in that
the first transmission means includes an antenna, and
the second transmission means includes a network connection.

9. System for distributing information, comprising:
at least one content source,
at least one client,
a communication network,
a distribution server,
a profile database associated with the distribution server and in which client information is stored,
a target count unit in the distribution server for effecting a target count by comparing the client profile information of the profile database with target client information of a target count request sent from one of the content sources, wherein information from one of the content sources is distributed to at least one client by means of the distribution server,
wherein the information is distributed in correspondence to the result of the target count, and
a decision unit in the distribution server for comparing the result of the target count with a predetermined threshold, wherein
in case the result of the target count step exceeds the predetermined threshold, the information is distributed from the distribution server to the clients by means of a broadcast transmission using a first transmission means, and
in case the result of the target count step is smaller than the predetermined threshold, the information is distributed from the distribution server to the clients by means of a targeted transmission using a second transmission means.

10. System for distributing information according to claim 9, characterized by
a unit for changing the parameters of the logical and/or physical distribution channel from the distribution server to the at least one client depending on the result of the target count.

11. System for distributing information according to claim 9, characterized by
a feedback channel respectively from a client, which received information distributed by the distribution server, to the distribution server and/or the content sources for transmitting an action feedback information representing an action of an user of the corresponding client in response to the information distributed by the distribution server.

12. System according to claim 11,
wherein the action feedback information is used to update the profile database.

13. System according to claim 11,
wherein the distribution server generates an action report information based on the action feedback information and transmits the action report information to the corresponding content source.

14. System according to claim 10, characterized in that
the information distributed by the distribution server contains a link information representing an address of the network where further information related to the information distributed by the distribution server is stored.

15. System according to claim 10, characterized in that
the profile database is updated every time a user of a client is signing up with the distribution server.

16. System for distributing information according to claim 9, characterized in that
the first transmission means includes an antenna, and
the second transmission means includes a network connection.

17. Server for the distribution of information,
a profile database in which client information is stored,
a target count unit for effecting a target count by comparing the client profile information of the profile database with target client information of a target count request sent from a content source connected to the distribution server, wherein the distribution server is designed to distribute information to at least one client in correspondence to the result of the target count by means of a network, and
a decision unit for comparing the result of the target count with a predetermined threshold, wherein
in case the result of the target count step exceeds the predetermined threshold, the information is distributed from the distribution server to the clients by means of a broadcast transmission using a first transmission means, and
in case the result of the target count step is smaller than the predetermined threshold, the information is distributed from the distribution server to the clients by means of a targeted transmission using a second transmission means.

18. Server for the distribution of information according to claim 17, characterized by
a unit for changing the parameters of the logical and/or physical distribution channel from the distribution server to the at least one client depending on the result of the target count.

19. Server for the distribution of information according to claim 17, characterized in that
it comprises a feedback evaluation unit for analysing a feedback channel signal from one of the clients.

20. Server for the distribution of information according to claim 17, characterized in that
the profile database is updated every time a user of a client is signing up with the distribution server.

21. Server for the distribution of information according to claim 17, characterized in that
the first transmission means includes an antenna, and
the second transmission means includes a network connection.

* * * * *